Jan. 16, 1968  A. K. FOSTER ET AL  3,363,475

SHOCK ABSORBER

Filed Dec. 13, 1965

INVENTORS
ANTOINETTE K. FOSTER &
BUEL R. FOSTER
BY
Dunlap and Daney
ATTORNEYS

United States Patent Office 3,363,475
Patented Jan. 16, 1968

3,363,475
SHOCK ABSORBER
Antoinette K. Foster, 2713 Wyoming NE., Apt. 30, Albuquerque, N. Mex. 87112, and Buel R. Foster, Fort Worth, Tex.; said Buel R. Foster assignor to said Antoinette K. Foster
Filed Dec. 13, 1965, Ser. No. 513,347
9 Claims. (Cl. 74—103)

ABSTRACT OF THE DISCLOSURE

Apparatus for providing shock absorbing coupling between a polished rod supporting down-well rod and valving equipment and a well pump jack driven in vertical reciprocation, the apparatus consisting of a first outer cylindrical member and a second inner cylindrical member disposed concentrically within said outer cylindrical member and surrounding the polished rod in sliding relation, and having a resilient substance filling the concentric space between the inner cylindrical member and the other cylindrical member. The resilient substance may be suitably bonded within the concentric space, and supporting projections extend into the resilient substance from each of the inner and outer cylindrical members to enable secure but flexible affixure between the inner and outer cylindrical members.

---

This invention relates generally to improved shock absorbers. More particularly, but not by way of limitation, this invention relates to an improved shock absorber useful in well pumping apparatus.

Generally, this invention provides an improved shock absorber comprising: a tubular outer member having both ends open and an inwardly projecting flange in the interior thereof near the medial portion of the outer member; a tubular inner member disposed within the outer member and having a pair of spaced exterior flanges thereon, the flanges being located on each side of the inwardly projecting flange and remote from the ends of the inner member, the inner and outer members defining an annular space therebetween; and, a resilient material substantially filling the annular space resiliently connecting the members to permit limited relative movement therebetween.

One object of the invention is to provide an improved shock absorber for use with reciprocating well pumps that absorbs the shock imposed by the pump operating mechanism when the direction of movement thereof is reversed.

A further object of the invention is to provide an improved shock absorber for use with the operating mechanism for reciprocating well pumps that can be easily and quickly installed on existing apparatus.

Another object of the invention is to provide an improved shock absorber wherein the force transmitted therethrough is transferred entirely by a resilient medium.

One other object of the invention is to provide an improved shock absorber that can be quickly and easily combined with identically constructed absorbers wherein forces of greater magnitude can be transmitted therethrough.

Still another object of the invention is to provide an improved shock absorber that can be quickly and easily manufactured.

The foregoing and additional objects and advantages of the invention will become more apparent as the following detailed description is read in conjunction with the accompanying drawings wherein like reference characters denote like parts in all views and wherein.

Figures 1, 2, 3:
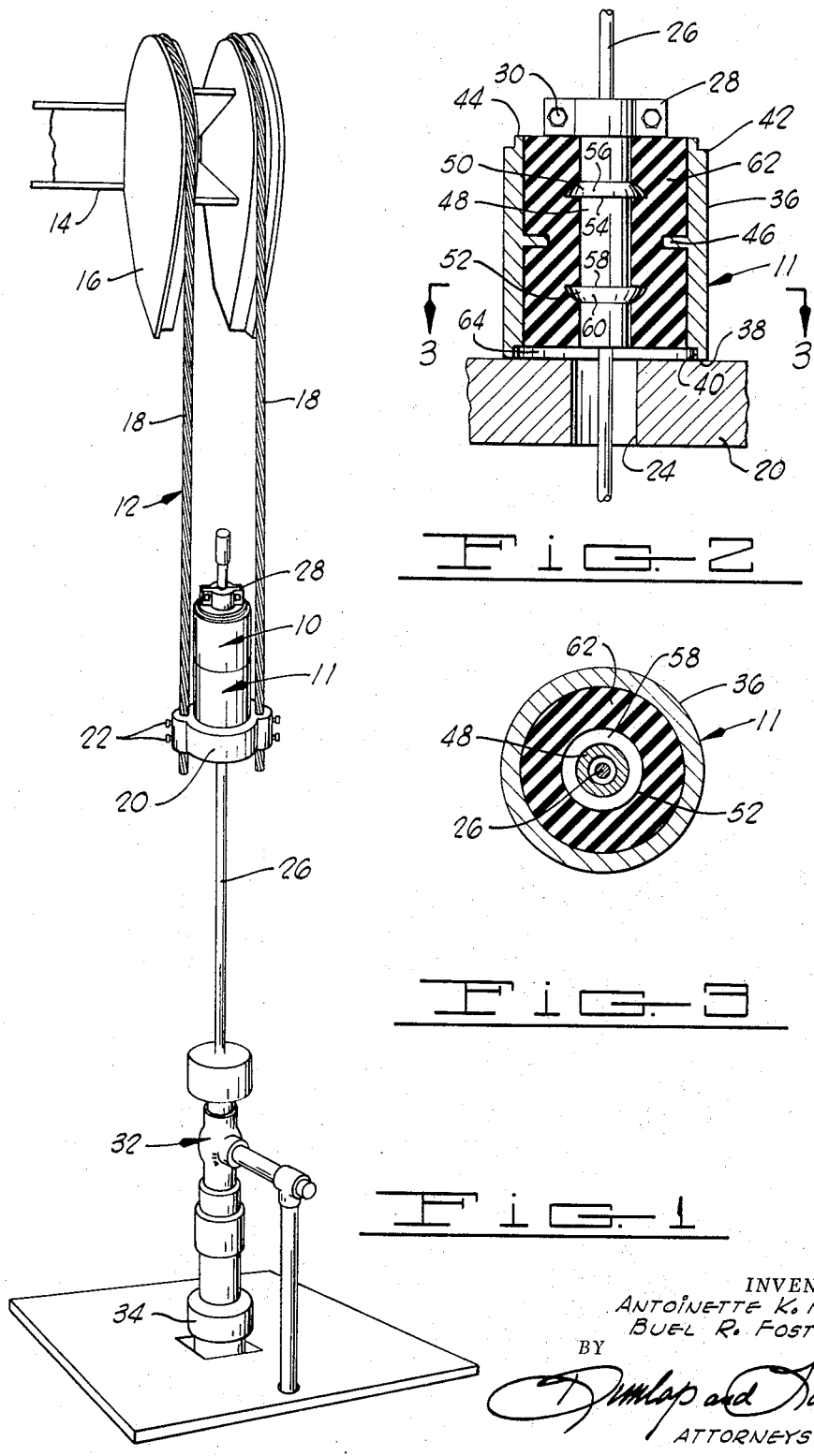
FIG. 1 is a pictorial view illustrating the installation of a pair of shock absorbers, constructed in accordance with the invention, in a reciprocating well pump operating mechanism.
FIG. 2 is a fragmentary, vertical cross-sectional view illustrating in more detail the structure of a single shock absorber and its installation in the well pump operating mechanism.
FIG. 3 is a horizontal cross-sectional view of the shock absorber taken substantially along the line 3—3 of over FIG. 2.

Referring to the drawing and to FIG. 1 in particular, shown therein and generally designated by the reference characters 10 and 11 are a pair of shock absorbers that are constructed in accordance with the invention. As illustrated in FIG. 1, the shock absorbers 10 and 11 are installed in a pump operating mechanism generally designated by the reference character 12.

The pump operating mechanism 12 includes a pump jack 14 of the usual construction that has a head portion 16 thereon. Although not shown, the pump jack 14 extends to a driving mechanism arranged to move the pump jack 14 in a rather large and limited art thereby moving the head portion 16 in a substantially vertical direction.

A pair of cables 18 have their upper ends connected with the head portion 16 and the lower ends thereof extending into engagement with a cross member 20. The cross member 20 is fixed to the cables 18 by a plurality of threaded fasteners 22 mounted in the cross member 20.

The cross member 20 includes an opening 24 (see FIG. 2) that extends vertically therethrough and encircles a polish rod 26. The polish rod 26 is also of well known construction and extends upwardly through the shock absorbers 10 and 11.

As shown in FIGS. 1 and 2, a split clamp 28 is attached to the polish rod 26 by a pair of threaded fasteners 30. The clamp 28 serves as an abutment on the polish rod 26 whereby upward movement of the cross member 20 with the cables 18 forces the shock absorber 10 into engagement with the clamp 28 to lift the polish rod 26.

The polish rod 26 extends downwardly through a conventional well head assembly generally designated by the reference character 32. The well head assembly 32 is connected with a pipe 34 that extends downwardly into the well bore (not shown).

The lower end (not shown) of the polish rod 26 is connected with a plurality of elongated rod members, known as "sucker rods," (not shown) that extend into operable connection with a reciprocating well pump (not shown) located in the well bore.

FIG. 2 illustrates in more detail the construction of the shock absorber 11. It should be pointed out that the shock absorbers 10 and 11 are identically constructed and, therefore, only the shock absorber 11 will be described in detail, it being understood that like reference characters will apply to the shock absorber 10 when reference is made thereto in the following description.

As shown in FIG. 2, the shock absorber 11 includes a tubular outer member 36 having a lower end 38 in engagement with the cross member 20. As shown therein, the lower end 38 includes a counterbore 40 for purposes that will become more apparent hereinafter.

An upper end 42 of the tubular outer member 36 includes an axially extending flange 44 that is sized to fit into the counterbore 40 on an adjacent shock absorber, such as the shock absorber 10. When the axial flange 44 is disposed in the counterbore 40, the shock absorbers, such as 10 and 11 illustrated in FIG. 1, are axially aligned.

The tubular outer member 36 also includes an inwardly projecting annular flange 46 located near the medial portion thereof. The flange 46 may be constructed integrally with the tubular outer member 36 or may be constructed as a separate member and welded or otherwise suitably attached thereto.

A tubular inner member 48 is disposed within the tubular outer member 36. The tubular inner member 48 encircles the polish rod 26 as is most clearly shown in FIG. 3.

Exterior flanges 50 and 52 are provided on the exterior of the tubular inner member 48. As illustrated in FIG. 2, the exterior flange 50 is disposed relatively above the inwardly projecting flange 46 on the tubular outer member 36 and the flange 52 is disposed relatively below the inwardly projecting flange 46.

The flange 50 includes a lower planar surface 54 that is disposed at a right angle relative to the axis of the tubular inner member 48 and an arcuate surface 56 that extends between the tubular inner member 48 and the outer periphery of the planar surface 54. Similarly, the flange 52 includes a planar surface 58 that is disposed substantially at right angles to the axis of the tubular inner member 48. It will be noted in FIG. 2 that the planar surface 58 faces upwardly, that is, faces the planar surface 54 of the flange 50. The flange 52 also includes an arcuate surface 60 that extends between the tubular inner member 48 and the outer periphery of the planar surface 58.

As clearly illustrated in FIG. 2, the tubular outer member 36 and the tubular inner member 48 cooperate to form an annular space therebetween that is substantially filled with a resilient material 62. The resilient material 62 may be a natural or synthetic rubber or a resilient plastic. It is preferred that the resilient material 62 be resistant to the effects of hydrocarbons.

It will be noted in FIG. 2 that there is no resilient material 62 in the counterbore 40, therefore, a space 64 exists between the cross member 20 and the resilient material 62. From the foregoing, it can be appreciated that the resilient material 62 connects the tubular inner member 48 with the tubular outer member 36 and, due to the presence of the space 64, permits a limited amount of relative movement therebetween as will appear more fully hereinafter.

*Operation*

Shock absorbers constructed in accordance with the invention are utilized as illustrated in FIGS. 1 and 2. If the weight of the polish rod 26 and the connected sucker rods (not shown) is not too great, the single shock absorber 11 can be utilized as illustrated in FIG. 2. As shown therein, the polish rod 26 extends through the cross member 20 and through the shock absorber 11. The collar 28 is attached to the polish rod 26, resting on top of the tubular inner member 48 and the resilient material 62. Since the clamp 28 does not extend into engagement with the tubular outer member 36, it can be seen that any force exerted by the polish rod 26 is carried by the resilient material 62.

The force exerted on the resilient material 62 by the polish rod 26 is transmitted to the tubular outer member 36 which has its lower end 38 resting on the cross member 20. Therefore, it can be seen that the forces are carried by the resilient material 62. Thus, shock loading, due to a reversal in direction of the reciprocation of the head portion 16, or vibration transmitted through the sucker rods (not shown) and the polish rod 26 are absorbed in the resilient material 62.

If the shock loads are sufficiently great, the resilient material 62 is deformed downwardly into the space 64 until it engages the cross member 20. As will be apparent from viewing FIG. 2, the resilient material 62 is deformed due to its engagement with the exterior flanges 50 and 52 on the tubular inner member 48 and with the inwardly projecting flange 46 on the tubular outer member 36 since the flanges cooperate to prevent movement of the resilient material 62 relative to either the tubular inner member 48 or the tubular outer member 36. Thus, the resilient material 62 functions to absorb the shock loads and vibration, thereby increasing the service life of the sucker rods and subsurface pump (not shown).

If the force required to operate the subsurface pump (not shown) is sufficiently great, it may be necessary or desirable to use more than one shock absorber as illustrated by the shock absorbers 10 and 11 in FIG. 1. When installed in this manner, the axial flange 44 on the shock absorber 11 is inserted into the counterbore 40 on the lower end 38 of the shock absorber 10, whereby the shock absorbers 10 and 11 are held in axial alignment. The clamp 28 is attached to the polish rod 26 above the shock absorber 10 as is clearly shown in FIG. 1.

Although not shown, it can be appreciated that the resilient material 62 contained in the shock absorber 10 fully engages the resilient material 62 in the shock absorber 11, whereby the only deformation that can take place is into the space 64 in the shock absorber 11. Thus, the load-carrying characteristic of the shock absorbers is, for all practical purposes, twice that of a single shock absorber.

Manifestly, it is anticipated that even greater loads will be encountered. In such a situation, additional shock absorbers 10 or 11 may be placed thereon in axial alignment as exemplified by the shock absorbers 10 and 11 shown in FIG. 1. Therefore, it is possible by combining a plurality of shock absorbers to accommodate any reasonable load that will be encountered in operating subsurface pumps.

A shock absorber constructed in accordance with the invention may be quickly and easily manufactured by standard and well known manufacturing procedures at an economical cost. Furthermore, the shock absorbers can be used with presently existing subsurface pump operating equipment such as is illustrated in FIG. 1 without modification. It should also be obvious that little or no maintenance is required on the shock absorbers themselves and that the use of the shock absorbers reduces the maintenance on the subsurface pump and the sucker rods connected thereto.

Having described but a single embodiment of the invention, it should be apparent that it is presented by way of example only and that many changes and modifications can be made thereto without departing from the spirit of the invention or from the scope of the annexed claims.

What we claim is:

1. A shock absorber comprising:
   a tubular outer member having both ends open and an inwardly projecting flange in the interior thereof near the medial portion of said member;
   a tubular inner member disposed within said outer member and having a pair of spaced exterior flanges thereon, said flanges being located on each side of said inwardly projecting flange and remote from the ends of said inner member, said inner and outer members defining an annular space; and,
   a resilient material substantially filling said annular space resiliently connecting said members to permit limited relative movement therebetween.

2. The shock absorber of claim 1 wherein said tubular outer member also includes:
   a counterbore in one end; and,
   an axial flange on the other end, said axial flange being sized to fit into said counterbore whereby said shock absorber can be arranged in axial alignment with additional identical shock absorbers.

3. The shock absorber of claim 1 wherein each of said exterior flanges includes:
   a planar surface disposed substantially perpendicularly to the axis of said tubular inner member; and,
   an arcuate surface extending between the exterior of said tubular inner member and the periphery of said planar surface.

4. The shock absorber of claim 3 wherein the planar surface on one exterior flange faces the planar surface on the other exterior flange.

5. The shock absorber of claim 1 wherein said tubular outer member includes
a counterbore in one end, and
an axial flange on the other end sized to fit into said counterbore; and, wherein each of said exterior flanges includes
 a planar surface disposed substantially perpendicularly to the axis of said tubular inner member with one of said planar surfaces facing the other planar surface, and
 an arcuate surface extending between the exterior of said tubular inner member and the periphery of said planar surface.

6. In a well pump actuating means:
a driven pump jack having a head portion movable in a substantially vertical direction;
a pair of downwardly extending cables having the upper end thereof connected with said pump jack head portion;
a cross member extending between and connected with the lower ends of said cables, said cross member having an opening extending therethrough;
a polish rod disposed in said opening;
a well head assembly adapted to be connected with the well and arranged to receive said polish rod;
a shock absorber encircling said polish rod and including
 a tubular outer member having upper and lower open ends and an inwardly projecting flange in the interior thereof between said ends, the lower end engaging said cross member,
 a tubular inner member disposed within said outer member and encircling said polish rod, said inner member having a pair of spaced exterior flanges thereon located on each side of said inwardly projecting flange and remote from the ends of said inner member, said inner and outer members defining an annular space, and
 a resilient material filling said annular space resiliently connecting said members to permit limited relative movement therebetween; and,
a clamp attached to said polish rod in engagement with said inner member whereby upward movement of said pump jack head portion exerts a force on said shock absorber to raise said polish rod.

7. The pump actuating means of claim 6 wherein said tubular outer member also includes:
a counterbore in one end; and,
an axial flange on the other end and sized to fit into said counterbore.

8. The pump actuating means of claim 7 and also including a second shock absorber identical to said first-mentioned shock absorber, said second shock absorber disposed between said first mentioned shock absorber and said clamp and having the axial flange on said first mentioned shock absorber disposed in the counterbore in said second shock absorber.

9. The pump actuating means of claim 8 wherein each of the exterior flanges on said tubular inner members includes:
a planar surface disposed substantially perpendicularly to the axis of said tubular inner member; and
an arcuate surface extending between the exterior of said tubular inner member and the periphery of said planar surface.

References Cited

UNITED STATES PATENTS

| | | | |
|---|---|---|---|
| 2,038,527 | 4/1936 | Eaton | 74—582 |
| 2,925,266 | 2/1960 | McAllister | 74—582 X |
| 3,160,111 | 12/1964 | Berry | 74—581 X |
| 3,169,783 | 2/1965 | Harbers et al. | 267—1 X |

FRED C. MATTERN, Jr., *Primary Examiner.*

W. S. RATLIFF, *Assistant Examiner.*